United States Patent [19]

Sarian et al.

[11] 4,133,678

[45] Jan. 9, 1979

[54] FERRO-ALLOY PROCESS AND PRODUCT

[76] Inventors: Ardaches Sarian, 2600 Bathurst #701, Toronto, Ontario, Canada, M6B 2Z4; Andres G. Sarian, 66 Collier St., #9C, Toronto, Ontario, Canada, M6W 1L9

[21] Appl. No.: 827,325

[22] Filed: Aug. 24, 1977

Related U.S. Application Data

[63] Continuation-in-part of Ser. No. 794,106, May 5, 1977, abandoned.

[30] Foreign Application Priority Data

Aug. 26, 1976 [CA] Canada ................................. 259900

[51] Int. Cl.$^2$ ............................................... C21C 7/00
[52] U.S. Cl. ..................................... 75/53; 75/0.5 R; 75/0.5 BA; 75/3; 75/129; 423/409
[58] Field of Search ............... 75/3, 4, 5, 0.5 R, 0.5 B, 75/0.5 BA, 25, 43, 44 R, 44 S, 53, 57, 93 R, 93 A, 256, 257, 251, 252, 253, 129; 423/409; 148/16.6

[56] References Cited

U.S. PATENT DOCUMENTS

| 1,629,563 | 5/1927 | Westberg | 75/448 |
| 2,872,292 | 2/1959 | Altmann | 423/409 |
| 3,066,022 | 11/1962 | Yumazaki | 148/16.6 |
| 3,704,116 | 11/1972 | Paris et al. | 423/409 |
| 4,004,916 | 1/1977 | Kreiger | 75/3 |
| 4,004,918 | 1/1977 | Fukuoka et al. | 75/3 |

FOREIGN PATENT DOCUMENTS

| 623469 | 7/1961 | Canada | 75/0.5 BA |
| 1178219 | 9/1964 | Fed. Rep. of Germany | 75/0.5 BA |
| 42-164 | 10/1964 | Japan | 75/129 |
| 1142228 | 8/1967 | United Kingdom | 423/409 |
| 1091116 | 11/1967 | United Kingdom. | |
| 1135812 | 12/1968 | United Kingdom | 423/409 |

OTHER PUBLICATIONS

Mellor; J. W.; Supplement to Mellor's Comprehensive Treatise on Inorganic and Theoretical Chemistry, vol. VIII, Supp. I, pp. 214–215, (1964).
Sidgwich; N. Y.; The Chemical Elements and Their Compounds, vol. 5, Oxford, p. 658 (1950).

Primary Examiner—L. DeWayne Rutledge
Assistant Examiner—Michael L. Lewis

[57] ABSTRACT

This invention is directed to the making of a ferro-nitrogen addition agent for steel making processes. The ferro-nitrogen agent is derived in my process from waste materials of steel making and processing.

14 Claims, No Drawings

FERRO-ALLOY PROCESS AND PRODUCT

This is a continuation-in-part of the application for a patent, which was filed on May 5, 1977 under the Ser. No. 794,106 Group 223 and which is abandoned.

BACKGROUND OF THE INVENTION

It is known that, in the fabrication of several types of steel the incorporation of the nitrogen(N) leads to the formation of stable nitrides with elements such as chromium(Cr), vanadium(V), niobium(Nb), aluminium(Al), etc., improving the austenitic structure of steel.

It is also known that, in certain cases, the nitrogen can replace, in some proportion, the nickel(Ni), due to its powerful gammagene properties.

In the iron crystal-structure, the nitrogen takes an interstitial position, which creates a distortion of the structure and contributes to the decrease in the size of the crystal-structure and the increase in the resistance to grain growth in working.

The nitrogen bearing steels, especially the stainless steels with chromium, are more ductile, more workable over a wider range of chromium content. Cold forming operations may be carried out more succesfully over a wider range of temperatures.

Further, the tensile strength of commercial steels is much improved by the presence of nitrogen. A small proportion of nitrogen (i.e. 0.008%) can improve the yield point and thus replace a certain quantity of manganese(Mn), which disturbs the rimming process in the big moulds (over 15 tons ingots). This is the reason for the tendency to alloy the rimmed steel with nitrogen.

Regarding the art of introducing nitrogen into the liquid steel, the following methods should be mentioned:
- the introduction of molecular nitrogen in liquid steel through nozzles or perforated electrodes, below the slag layer and its conversion into atomic state, which is incorporated by the liquid steel,
- the blowing of compressed air or nitrogen-gas through the lance of the converter, together with oxygen, or the blowing of molecular nitrogen or ammonia(NH3) in the ladle through porous refractories,
- the introduction of organic substances containing nitrogen into the liquid steel (in furnace or ladle),
- the introduction of nitrogen bearing refined ferro-alloys (ferro-manganese or ferro-chromium) into the liquid steel (in furnace or ladle).

With the exception of the ferro-alloy method, all the other methods have a limited field of application or a nitrogen assimilation with a high degree of dispersion.

The ferro-alloy method is used more often because it facilitates the nitrogen penetration into the liquid steel in a wide range of nitrogen content and with a small scattering of the assimilated nitrogen.

However, due to the manganese or chromium content in the final analysis of the steel, there is a limit to the amount of nitrogen which can be introduced, because together with the nitrogen important quantities of manganese or chromium are assimilated into the steel (10-15 times more than nitrogen). These refined ferro-alloys bear high contents of manganese or chromium and therefore are more expensive than the standard ferro-alloys.

This invention discloses a new type of ferro-alloy, the FERRO-NITROGEN or NITRIDED IRON, which bears an important content of nitrogen but is free of other elements such as manganese or chromium.

The FERRO-NITROGEN keeps the advantages of the conventional ferro-alloys method but is not limited in its usage by the presence of manganese or chromium. The FERRO-NITROGEN can be used in the fabrication of any type of steel in which the presence of nitrogen is necessary for the achievement of all the improvements the nitrogen conveys to the physical properties of the steel.

SUMMARY OF THE INVENTION

This invention relates to FERRO-NITROGEN and the art of producing it.

One object of our invention is the provision of a process for producing a ferro-alloy containing as prime element the nitrogen, without the presence of other elements such as manganese or chromium, usually existent in the known ferro-manganese or ferro-chromium, which bear nitrogen and are used in the fabrication of various types of steel, including stainless steels.

The use of FERRO-NITROGEN will prevent the introduction of certain quantities of manganese or chromium in the fabrication of several types of steel, in which these elements are undesirable.

Another object of our invention is to use inexpensive raw materials, such as:
- metallic ejections (grits, sludges, powder from exhausted fumes-flue dust) resulting from various steel making processes,
- iron oxides (powder and scale), steel powder and iron powder resulting from secondary steel processes such as forging, rolling, drawing, etc.,
- iron pellets and their residual powder,
- iron powder.

The FERRO-NITROGEN will be produced by treating accordingly the mentioned raw materials, under the following conditions:
- grinding the raw materials and separating (size selection) the fine powder with particles smaller than 30 microns,
- reducing the fine powder of iron oxides with hydrogen or carbon monoxide at a temperature of 1400°–1600° F. (760°–870° C.). To avoid the sticking of the iron powder an addition of fine silica(-SiO2) should be used. The final grading of the iron powder must be below 30 microns.
- diffusing atomic nitrogen into the iron or steel powder in order to obtain iron nitride with a content of nitrogen up to 6%. For this operation should be used a rotary furnace or a fluidized bed installation at a temperature of 1100°–1350° F. (590°–730° C.). By passing through the installation, loaded with iron powder, anhydrous ammonia(NH3) with at least 98% concentration and a pressure of up to 8 inches (200mm) water column, the ammonia will be dissociated in hydrogen and atomic nitrogen, which at the mentioned temperature (1100°–1350° F. (590°–730° C.) will diffuse into the iron powder, forming iron nitride(mostly Fe4N).

The duration of this nitriding process depends on the grading of the iron particles (about 5 min. for 1 micron, 8.5 hours for 10 microns and more than 48 hours for 20 microns. A prior grading of the iron powder will indicate the nitriding time.

Before and after the nitriding process, the installation should be washed by passing-through argon or molecular nitrogen.

briquetting the nitrided iron powder with a mineral binder such as calcium monoxide(CaO), etc.. packing.

The FERRO-NITROGEN will be used as ferroalloy in the steel making process and when in contact with liquid steel, the iron nitride Fe4N, which is instable over about 930° F. (500° C.), is dissociated in iron and atomic nitrogen, which are assimilated into the liquid steel with an efficiency of 90-95%. During the solidification period of the steel the nitrogen atoms are taking, in the iron crystal-structure, an interstitial position, which creates the distortion of the structure, securing a high degree of the structural uniformity of the steel.

The FERRO-NITROGEN can be added either during the melting process, in the furnace, or in the ladle, before or during the tapping operation of the liquid steel.

The FERRO-NITROGEN is not toxic and its handling does not create toxical work conditions; in liquid steel this ferro-alloy does not eliberate toxic gases and therefore no special measures of precaution are necessary.

Using the above mentioned raw materials, the fabrication of the FERRO-NITROGEN will thus not depend on expensive or strategical materials, difficult to obtain. Some of the above mentioned materials are waste, normally trown-away by the steel producers, their recycling being an expensive operation. Another object of our invention is to produce iron powder by treating accordingly (separation, size selection, reduction, etc.) the iron oxides (powder and scale), the steel powder and iron powder resulting from exhausted fumes, flue dust, of various steel making processes and from secondary steel processes such as rolling, forging, drawing, etc..

Another object of our invention is the provision of a method of introducing nitrogen into steel by adding to the liquid steel, in the furnace or ladle, the FERRO-NITROGEN as produced by the method previously described.

Inasmuch as many embodiments are possible of our invention and many modifications may be made of the indicated embodiments, we desire that all matter described herein be considered by way of illustration and not by of limitation.

The embodiments of this invention in which an exclusive property or privilege is claimed are defined as follows:

1. A method of producing a ferronitride comprising mixing flue-dust containing iron oxide with metallic iron ejections consisting of grits, sludges or powders to form a mixture which contains no alloyed manganese or chromium, grinding said mixture to form a fine powder, grading said fine powder to obtain a fraction of below 30 microns in size, reducing the iron oxide in said fraction to metallic iron thereby forming a metallic fraction, nitriding said metallic fraction to form a ferro-nitride.

2. The method of claim 1, wherein said fraction is reduced at a temperature in the range of 1400°-1600° F.

3. The method of claim 1, wherein said fraction is reduced with hydrogen.

4. The method of claim 1, wherein said fraction is reduced with carbon monoxide.

5. The method of claim 2, wherein metallic iron is nitrided with atomic nitrogen.

6. The method of claim 2, wherein metallic iron is nitrided at a temperature in the range of 1100°-1350° F.

7. The method of claim 5, wherein the atomic nitrogen is derived from the dissociation of ammonia.

8. The method of claim 7, wherein the ammonia is introduced at a pressure of up to 8 inches water column.

9. The method of claim 1, wherein said fraction selected is less than 20 microns and is nitrided for a time up to 48 hours.

10. The method of claim 1, wherein said fraction selected is less than 5 microns and is nitrided for a time up to 6 hours.

11. The method of claim 1, wherein said fraction selected is less than 1 micron and is nitrided for a time up to 10 minutes.

12. The method of claim 1, wherein said ferronitride is briquetted.

13. The method of claim 12, wherein the said ferronitride powder is briquetted with a mineral binder.

14. The method of claim 1, further comprising adding said ferronitride to a furnace or ladle of liquid steel.

* * * * *